(12) United States Patent  (10) Patent No.: US 8,528,472 B2
Sacher  (45) Date of Patent: Sep. 10, 2013

(54) WIRE-BINDING DEVICE WITH POSITIONING MEANS

(75) Inventor: Christian Sacher, Buchloe (DE)

(73) Assignee: Wacker Neuson Produktion GmbH & Co. KG, Munich (DE)

( * ) Notice: Subject to any disclaimer, the term of this patent is extended or adjusted under 35 U.S.C. 154(b) by 0 days.

(21) Appl. No.: 13/641,255

(22) PCT Filed: Apr. 12, 2011

(86) PCT No.: PCT/EP2011/001835
§ 371 (c)(1),
(2), (4) Date: Oct. 15, 2012

(87) PCT Pub. No.: WO2011/128074
PCT Pub. Date: Oct. 20, 2011

(65) Prior Publication Data
US 2013/0032044 A1  Feb. 7, 2013

(30) Foreign Application Priority Data
Apr. 16, 2010 (DE) .......................... 10 2010 015 218

(51) Int. Cl.
*B65B 13/28* (2006.01)

(52) U.S. Cl.
USPC ............... 100/31; 140/119; 140/57; 140/93 A

(58) Field of Classification Search
USPC ............... 100/5, 12, 31; 53/397, 593; 24/27, 24/559; 140/119, 57, 93 A
See application file for complete search history.

(56) References Cited

U.S. PATENT DOCUMENTS 5,097,567 A * 3/1992 Glaus et al. ........................ 24/27
2004/0040450 A1 * 3/2004 Peroni et al. ...................... 100/5

FOREIGN PATENT DOCUMENTS

| DE | 4322763 C1 | 7/1994 |
| DE | 20203728 U1 | 7/2003 |
| KR | 20050052969 A | 6/2005 |

* cited by examiner

*Primary Examiner* — Jimmy T Nguyen
(74) *Attorney, Agent, or Firm* — Boyle Fredrickson, S.C.

(57) ABSTRACT

A wire-binding device for binding together at least two objects comprises a handle part via which the wire-binding device can be held by an operator. Pushing forward the handle part causes a V-shaped wire clip to be guided along the inside of two closing jaws of a mouth until the wire clip encloses the two objects which are to be connected. Additionally provided on the mouth is positioned having two mutually opposite guide faces of which the spacing from one another is less than the spacing of the closing jaws from one another.

9 Claims, 6 Drawing Sheets a) b) c)

WIRE-BINDING DEVICE WITH POSITIONING MEANS

BACKGROUND OF THE INVENTION

1. Field of the Invention

The present invention relates to a wire-binding device for binding together at least two objects with a wire.

2. Discussion of the Related Art

On construction sites, many situations require two objects to be permanently bound fixedly to one another. In particular in concrete construction, metal reinforcing bars situated parallel to one another or crossing one another at a right angle must be bound to one another using wire binders. This practice has given rise to the occupational group of steel fixers/rebar workers; this work is distinguished in particular by difficult physical activity.

A significant facilitation of the work of steel fixing can be achieved using the mechanical binding device DF 16 made by the company Wacker Neuson SE. Using this device, the operator can stand upright, in a comfortable working position, while binding the reinforcing bars to one another with a piece of wire. For this purpose, the operator presses a handle on the binder device downward, and then presses it upward again. When the handle is moved downward, a V-shaped wire clip is guided around the two reinforcing bars that are to be bound, so that the ends of the limbs of the V-shaped wire clip can finally hook together with one another. Subsequent pulling back of the handle twists the wire clip so that finally the two reinforcing bars are fixed.

In addition to the binding together of reinforcing bars, it is also possible for example to fasten heating pipes (floor heating) or empty pipes for electrical installations to a reinforcing bar.

The manner of operation of binding device DF 16 is explained in particular in EP 0 232 392 B1.

The exemplary embodiment described there, in FIGS. 13a through 27, has two stationary closing jaws situated opposite one another, in each of which there is formed a guide channel in order to guide the limbs of the wire clip around the two objects that are to be bound to one another. When the handle part is pressed by the operator, the frontmost wire clip is drawn from a magazine in which there is stored a strip of V-shaped wire clips, and, with the help of the closing jaws and the guide channels situated there, is guided around the two objects to be bound to one another.

The V-shaped wire clip has differently fashioned limbs. As is shown in particular also in FIGS. 22 through 24 of EP 0 232 392 B1, one of the limbs is made narrow and forms an eye, while the oppositely situated other limb forms a broader eye in which a pin projection is fashioned. By guiding the two limb ends around the objects that are to be bound, the narrower limb end can be guided into and through the eye of the broader limb end, and can finally hook onto the pin.

During the subsequent drawing back of the handle part, a binding hook appertaining to the device engages on a transition part that connects the two limbs of the wire clip and rotates the transition part, causing the wire clip to become twisted and tensioning the two objects to be bound with one another.

Binding device DF 16 has proven very successful in practical use. However, it has also turned out that in the case of objects having greatly differing diameters, for example the binding of a heating pipe having a large diameter (e.g. up to 26 mm) to a reinforcing bar having a smaller diameter (e.g. 5 mm), there is the possibility that the object having the larger diameter will deflect the limbs of the wire clip in such a way that the connecting links or eyes fashioned on the limbs no longer move into one another and can no longer hook together. The result is a failed binding, in which a permanent binding between the two objects cannot be achieved.

This problem is in particular also due to the fact that there is a too-small distance between the object having the large diameter and one of the guide channels in the respective closing jaw, so that on this side the wire eye cannot be guided with the correct bend. The problem also occurs in particular if the wire-binding device is not positioned precisely vertically, but rather for example at an angle, so that the one object lies against the one closing jaw and the other object lies against the other closing jaw.

SUMMARY OF THE INVENTION

The object of the present invention is to indicate a mechanical wire-binding device with which the risk of failed bindings can be reduced.

In accordance with an aspect of the present invention, a wire-binding device for binding together at least two objects with a wire has a handle part so that the operator can hold the wire-binding device, and a slide device for moving a wire clip, which is V-shaped in the initial state, forward relative to a wire clip mount when the handle part is moved forward by the operator. In addition, a twisting device is provided for twisting the wire clip when the handle part is moved backward by the operator, and a guide device is provided for guiding each of the two limbs of the V-shaped wire clip along a curve in order to bring together the ends of the limbs of the wire clip so that the ends are subsequently hooked to one another. The guide device has two closing jaws that are stationary relative to one another in the manner of a fork and situated at a distance from one another, on each of which there is provided a guide channel to which one of the limbs of the wire clip is supplied. The wire-binding device is characterized in that in the area of the closing jaws there is provided a positioning device having two guide surfaces situated opposite one another whose spacing from one another is smaller than the spacing of the closing jaws from one another.

The wire-binding device is based on the binding device described in EP 0 232 392 B1. In addition, according to the present invention the positioning device is provided in the area of the closing jaws. The positioning device can also be referred to as a centering device or target device, because it makes it possible for the wire-binding device to be better centered (i.e. positioned) relative to the objects that are to be bound.

The positioning device ensures that the objects are positioned more precisely between the closing jaws, because the objects are situated on the guide surfaces of the positioning device and can no longer come into contact with the further removed (i.e. situated behind the guide jaws) closing jaws or guide channels. The guide surfaces thus ensure a certain spacing of the objects from the closing jaws and from the guide channels provided there, so that the limbs of the wire clip can be guided in the guide channels and bent, so that they finally are wrapped around the two objects that are to be bound, and the ends of the limbs can be hooked together in the manner described in EP 0 232 392 B1.

In particular, in this way the mouth width of the guide surfaces of the positioning device can be smaller than the mouth width of the closing jaws.

Here it can be useful for the two guide surfaces situated opposite one another to be disposed essentially parallel to one another.

The two guide surfaces of the positioning device can be situated essentially in one plane together with the guide channels of the guide device, said plane extending perpendicular to the direction of movement of the handle part. This means that the two objects that are to be bound to one another are guided at the level of the guide channels by the two guide surfaces, or, conversely, that the wire-binding device is positioned relative to the objects with the aid of the two guide surfaces, and at the level of the guide channels it is ensured that there exists a sufficient predefined minimum distance between the guide channels (and thus the limbs of the wire clip pushed therein) and the objects, e.g. the reinforcing bars or a heating pipe.

The positioning device can be fashioned in the form of a fork having two prongs, the guide surfaces being situated on the insides of the two prongs of the fork. In this case, the design of the positioning device resembles that of the closing jaws of the guide device.

Run-in surfaces can be connected to each of the two guide surfaces of the positioning device, oriented toward an open side of the positioning device, in order to make it possible to more easily move objects that are to be placed between the fork-type closing jaws between the two guide surfaces. The run-in surfaces can be beveled or also fashioned as a radius in order to facilitate the targeting when the wire-binding device is placed onto the two objects that are to be bound. Thus, the run-in surfaces can for example be fashioned as run-in bevels.

The positioning device can be capable of being fastened to one of the components of the remaining wire-binding device with a positive fit. This makes sense for example in the case of the binding device DF 16 of the firm Wacker Neuson SE, because this device has a so-called plate mouth construction. The positive connection between the plate mouth and the positioning device ensures adequate stability even in heavy construction site operation.

The positioning device is capable of being fastened to the closing jaws as an add-on part.

The positioning device can also be used as a retrofit or supplementary kit with an already existing wire-binding device, or attached thereto. Thus, according to the present invention a separate positioning device is also provided for fastening to a wire-binding device as described above, having a main body and having two prongs extending from the main body that form a fork-shaped element together with the main body. A guide surface can be fashioned on each of the inner sides of the prongs, such that the spacing of the guide surfaces from one another does not exceed a specified dimension.

These and further advantages and features of the present invention are explained in more detail below on the basis of examples, with the aid of the accompanying figures.

DETAILED DESCRIPTION

Figure 1:
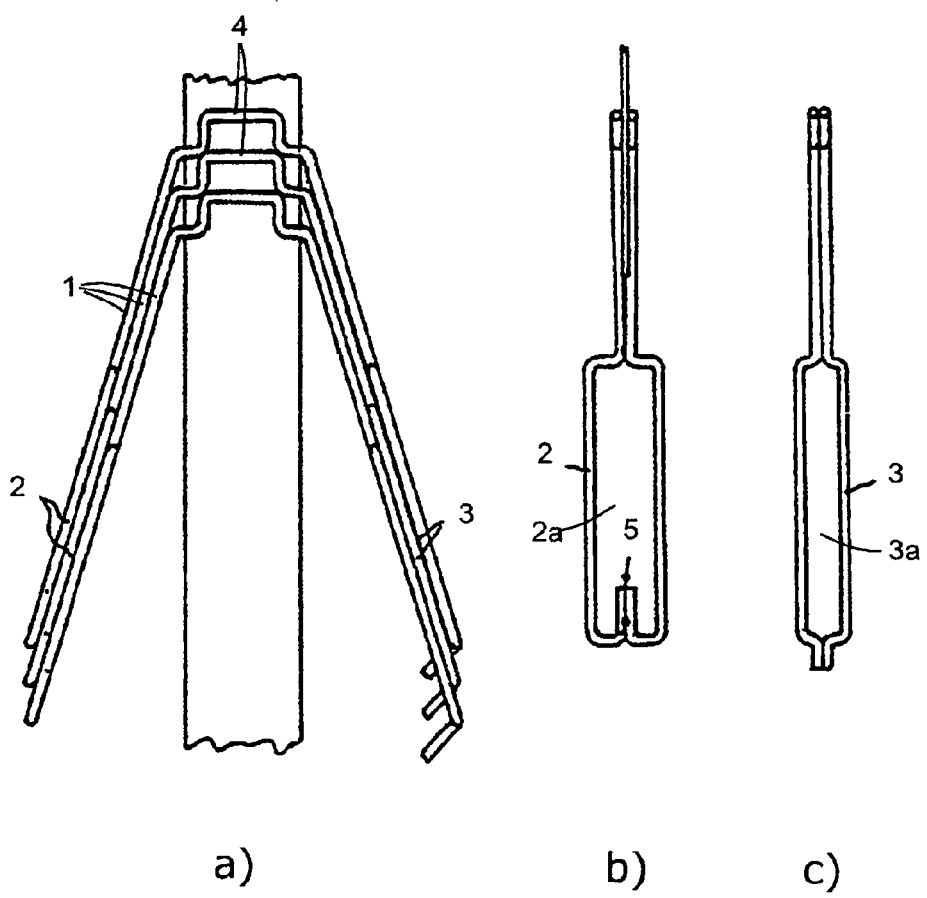
FIG. 1 shows a wire clip, known from EP 0 232 392 B1, in various views, appropriately labeled "PRIOR ART"

FIG. 1 shows the V-shaped wire clip known from EP 0 232 392 B1 in a front view, in the form of a short magazine strip of three wire clips 1 (FIG. 1a), as well as the two binding limbs 2, 3, in FIGS. 1b and 1c. Limbs 2, 3 are connected to one another in a transition area 4. The one binding limb 2 is broader than the other limb 3, and a hook 5 is fashioned on its end. Binding limbs 2, 3 each have eye-type openings 2a, 3a on their ends, opening 2a being broad enough that the end of narrow binding limb 3 can be guided through opening 2a.

By being guided in the wire-binding device, the narrower binding limb 3 is guided through the broader opening of binding limb 2. When binding limb 3 is moved back, its end hooks on hook 5 of binding limb 2.

Figure 2:
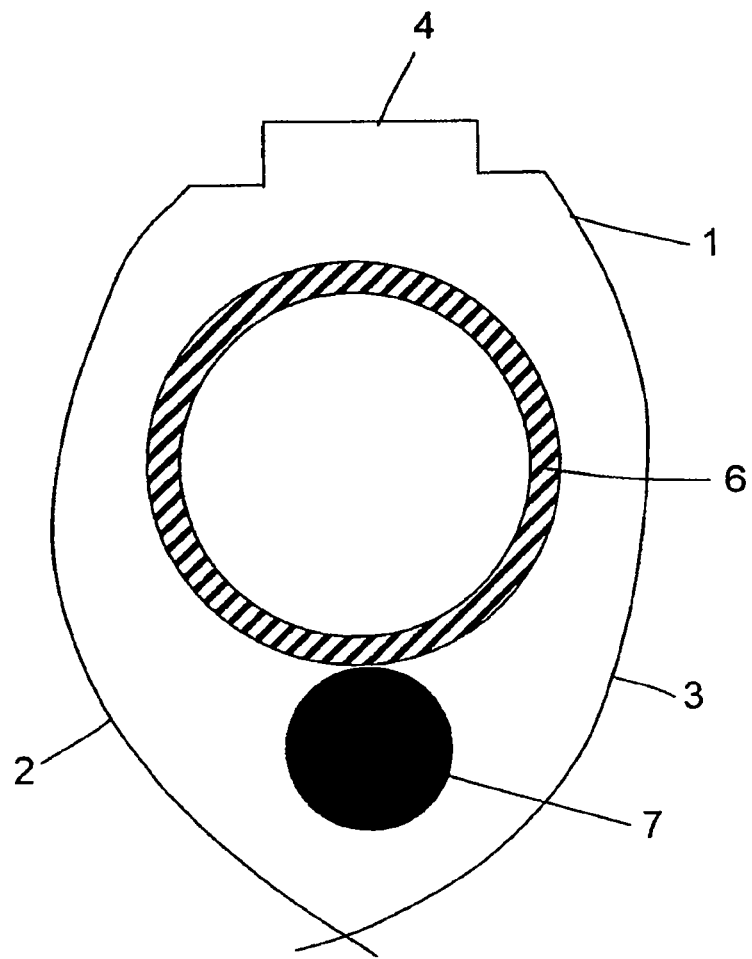
FIG. 2 shows an example of the binding of two objects with the wire clip, appropriately labeled "PRIOR ART"

FIG. 2 shows an example of how wire clip 1 is guided around two objects that are to be bound, namely in this case a heating pipe 6 and a reinforcing bar 7. The ends of limbs 2, 3 have already hooked together. In continuation of the representation shown in FIG. 2, a hook (not shown) of the wire-binding device engages at transition 4 and twists it, so that finally the entire wire is tensioned and holds heating pipe 6 and reinforcing bar 7 together.

Figure 3:
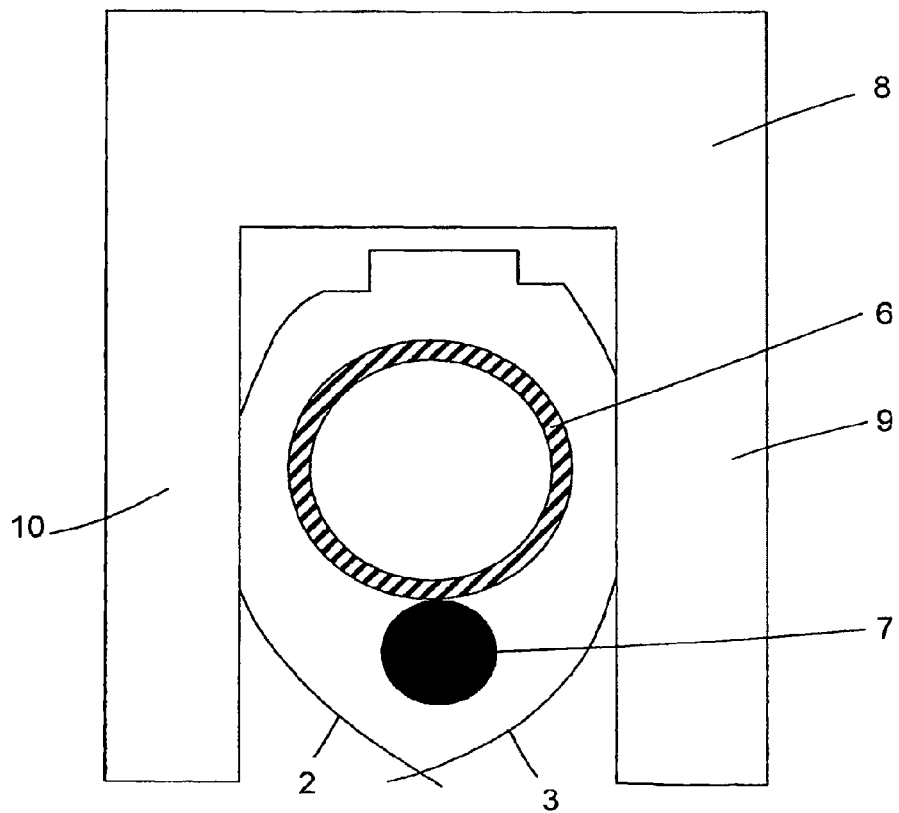
FIG. 3 shows the binding process with a schematically represented wire-binding device, appropriately labeled "PRIOR ART"

FIG. 3 shows a part of the wire-binding device in a schematic representation, namely a mouth 8 formed by two closing jaws 9 and 10 that are guided over the two objects 6, 7 that are to be bound.

As can be seen, the open space, i.e. the distance between heating pipe 6, which has a relatively large diameter, and closing jaws 10, is relatively small. Here there is the danger that the ends of the two binding limbs 2, 3 will not be able to hook together in the manner shown in FIGS. 2 and 3. There would then occur the above-described problem of a failed binding. This risk of a failed binding is also increased in particular if mouth 8 is not—as shown in FIG. 3—guided in perpendicular fashion over the two objects 6, 7 that are to be bound, but rather is set thereon obliquely.

Figure 4:
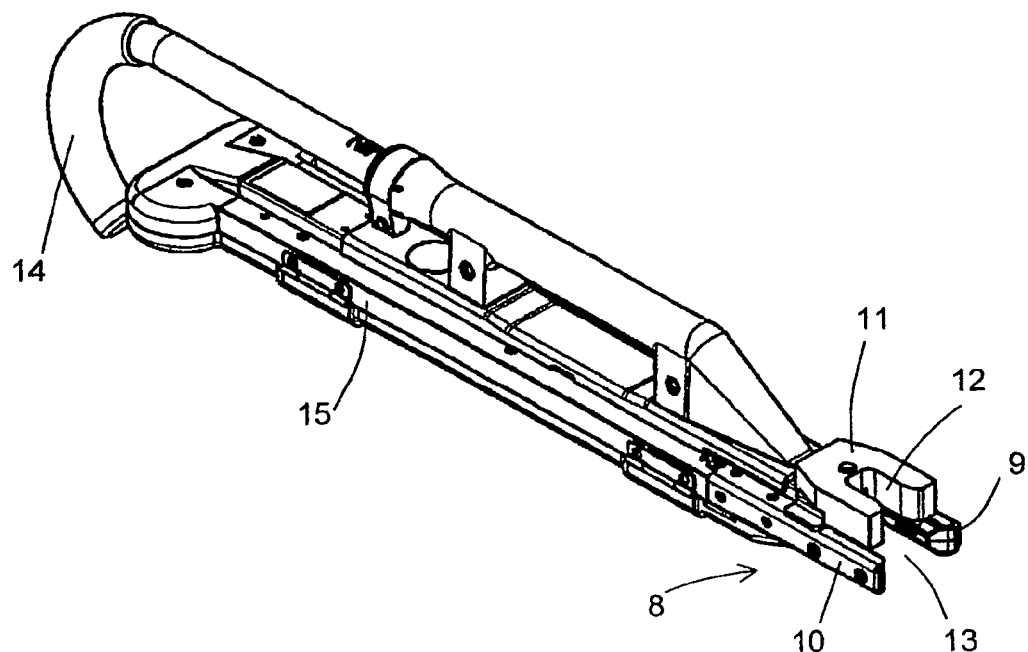
FIG. 4 shows the wire-binding device according to the present invention.
Figure 6:
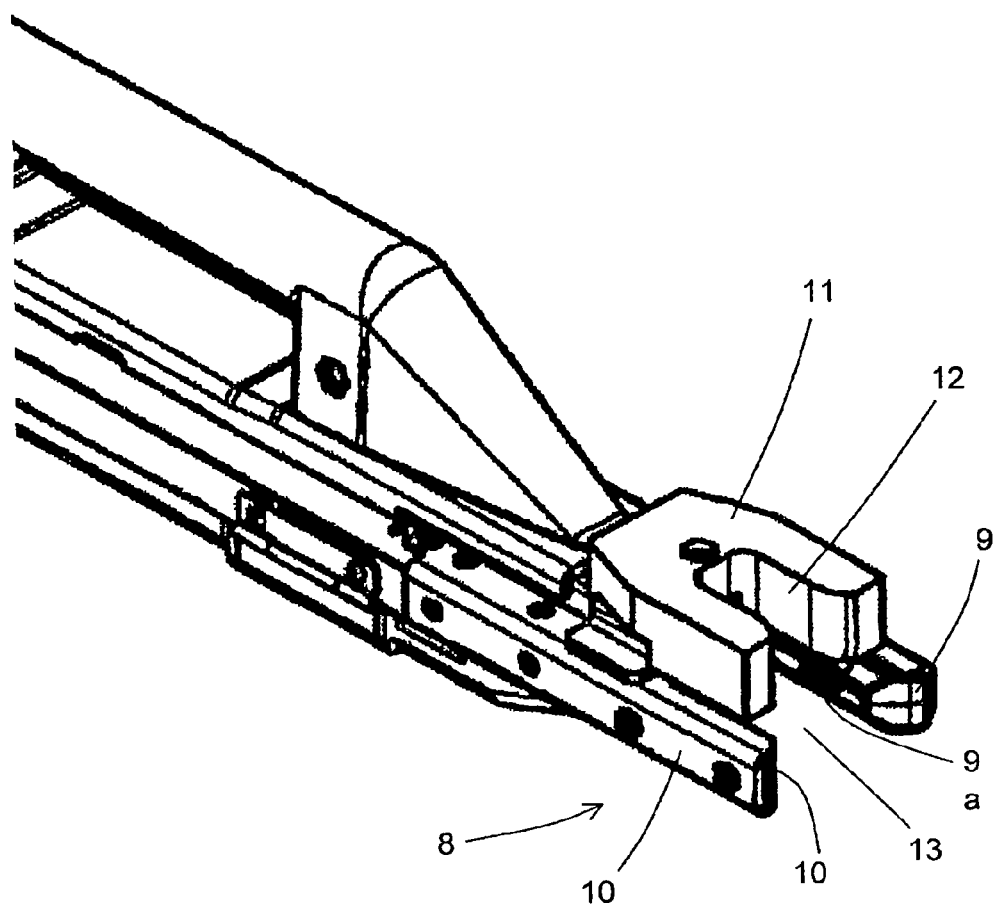
FIG. 6 shows the wire-binding device in an enlarged representation.

FIG. 4 shows a wire-binding device according to the present invention in which a positioning device 11 is fastened on mouth 8, i.e. on the two closing jaws 9, 10. As can be seen clearly in FIG. 4 and in an enlarged representation in FIG. 6, positioning device 11 has a smaller mouth width 12 than mouth width 13 of mouth 8. Because of this, the wire-binding device can be placed onto the two objects 6, 7 that are to be bound more precisely and in a more targeted, i.e. centered, fashion. This ensures an adequate distance from closing jaws 9, 10.

On the inner sides of closing jaws 9, 10 there are fashioned guide channels 9a, 10a in which limbs 2, 3 can be moved in guided fashion, as described in particular in EP 0 232 392 B1.

The wire-binding device has a handle part 14 with which an operator can hold and guide the wire-binding device in a manner similar to an umbrella. In a magazine area 15 there is stored a strip of V-shaped wire clips 1, from which the frontmost wire clip 1 is respectively diverted and is emitted via mouth 8. The precise manner of functioning of the wire-binding device is described in EP 0 232 392 B1, so that repetition here would be superfluous.

During operation, the operator places the wire-binding device, holding it by handle part 14, onto the objects 6, 7 that are to be bound. Here, positioning device 11 ensures that mouth 8 is positioned precisely in relation to the objects. Subsequently, the operator presses handle part 14 downward, causing a V-shaped wire clip 1 inside the wire-binding device to detach from the magazine strip and causing limbs 2, 3 of wire clip 1 to be guided along the inner sides of closing jaws 9, 10 in guide channels 9*a*, 10*a*, around the two objects 6, 7, and to be bent during this process. When the load is removed from handle part 14, or at the beginning of the moving back of handle part 14, the ends of binding limbs 2, 3 hook together, achieving the state shown in FIG. 2.

Through subsequent drawing back of handle part 14, transition 4 of wire clip 1 is twisted, and the binding process is completed.

Figure 5:
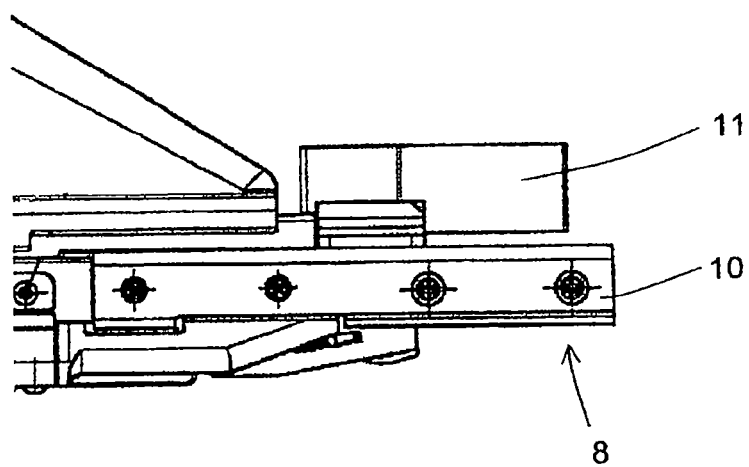
FIG. 5 shows a mouth segment of the wire-binding device in a side view.

FIG. 5 shows a left side view of mouth 8 with positioning device 11 additionally mounted thereon.

Figure 7:
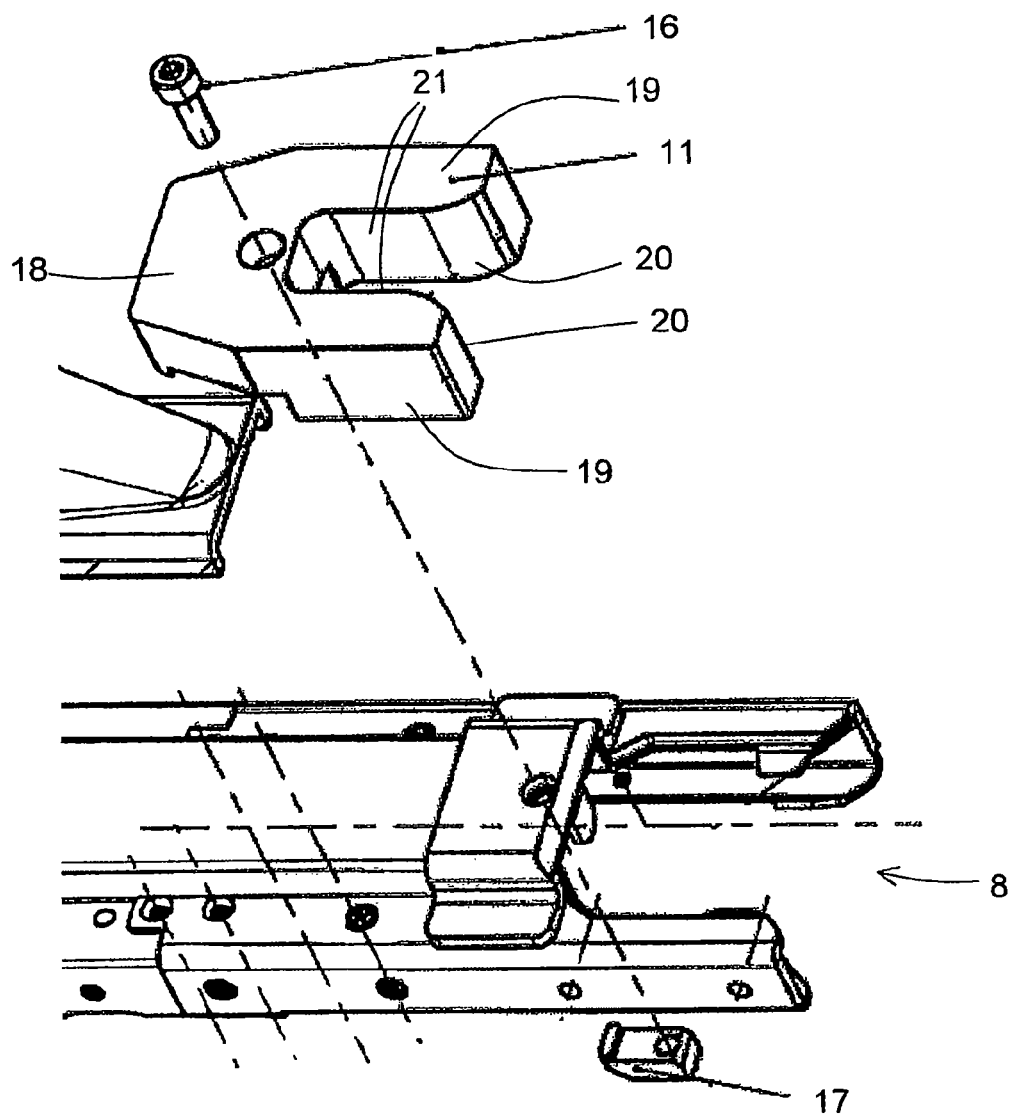
FIG. 7 shows an exploded view of the mouth segment.

For illustration, in FIG. 7 positioning device 11 is shown as an add-on device that can be screwed fixedly over mouth 8 of the wire-binding device with the aid of a screw 16 and a run-in block 17. In this way, a robust fastening of positioning device 11 on the mouth, realized as a plate construction, is ensured. Impacts to which positioning device 11 is unavoidably subjected during operation are in this way absorbed without danger and are borne without the risk of positioning device 11 separating over the rest of the device.

As FIG. 7 shows, positioning device 11 has a main body 18, made for example of aluminum, and two prongs 19 that extend laterally therefrom. The ends of prongs 19 can have run-in surfaces 20 that are rounded or beveled in order to facilitate the placement of the device. The actual guide surfaces 21 are connected to run-in surfaces 20, said guide surfaces being situated opposite one another and essentially parallel to one another. Guide surfaces 21 determine mouth width 12 of positioning device 11.

Positioning device 11 can be provided as original equipment in a new device, but can also be installed later as a retrofit solution.

We claim:

1. A wire-binding device for binding at least two objects with a wire, comprising:
    a handle part by which an operator can hold the wire-binding device;
    a slide device for the forward displacement of a wire clip, which is V-shaped in its initial state and which has two limbs, relative to a wire clip mount when the handle part is moved forward by the operator;
    a twisting device for twisting the wire clip when the handle part is moved backward by the operator; and
    a guide device for guiding each of the two limbs of the V-shaped wire clip along a curve in order to bring together the ends of the limbs of the wire clip, so that the ends can subsequently be hooked together;
    the guide device having two closing jaws that are stationary relative to one another and that are situated at a distance from one another in the manner of a fork, a guide channel for guiding one of the limbs of the wire clip being provided on each of said jaws; wherein
    in the area of the closing jaws there is provided a positioning device having two guide surfaces situated opposite one another whose spacing from one another is smaller than the spacing of the closing jaws from one another.

2. The wire-binding device as recited in claim 1, wherein a mouth width of the guide surfaces of the positioning device is smaller than a mouth width of the closing jaws.

3. The wire-binding device as recited in claim 1, wherein the two guide surfaces are situated essentially parallel to one another.

4. The wire-binding device as recited in claim 1, wherein the two guide surfaces of the positioning device, together with the guide channels of the guide device, essentially lie in one plane that extends perpendicular to the direction of movement of the handle part.

5. The wire-binding device as recited in claim 1, wherein:
    the positioning device is fashioned in the form of a fork having two prongs; and wherein
    the guide surfaces are situated on the inner sides of the two prongs of the fork.

6. The wire-binding device as recited in claim 1, wherein run-in surfaces are connected to each of the two guide surfaces of the positioning device, oriented toward an open side of the positioning device.

7. The wire-binding device as recited in claim 1, wherein the positioning device is capable of being fastened with a positive fit to one of the components of the rest of the wire-binding device.

8. The wire-binding device as recited in claim 1, wherein the positioning device is capable of being fastened on the closing jaws as an add-on part.

9. A positioning device for fastening to a wire-binding device, the wire-binding device comprising:
    a handle part by which an operator can hold the wire-binding device;
    a slide device for the forward displacement of a wire clip, which is V-shaped in its initial state and which has two limbs, relative to a wire clip mount when the handle part is moved forward by the operator;
    a twisting device for twisting the wire clip when the handle part is moved backward by the operator; and
    a guide device for guiding each of the two limbs (2, 3) of the V-shaped wire clip along a curve in order to bring together the ends of the limbs (2, 3) of the wire clip, so that the ends can subsequently be hooked together;
    the guide device having two closing jaws (9, 10) that are stationary relative to one another and that are situated at a distance from one another in the manner of a fork, a guide channel (9*a*, 10*a*) for guiding one of the limbs (2, 3) of the wire clip (1) being provided on each of said jaws;
    the positioning device having:
    a main body; and
    two prongs that extend from the main body and that, together with the main body, form a fork-shaped element;
    a guide surface that is fashioned on the inner sides of each of the prongs;
    wherein
    the spacing of the guide surfaces from one another is smaller than the spacing of the closing jaws of the wire-binding device.

* * * * *